July 30, 1935.  E. F. HATHAWAY ET AL  2,009,799
APPARATUS FOR DISPLAYING RUGS AND THE LIKE
Filed Feb. 2, 1932   7 Sheets-Sheet 4
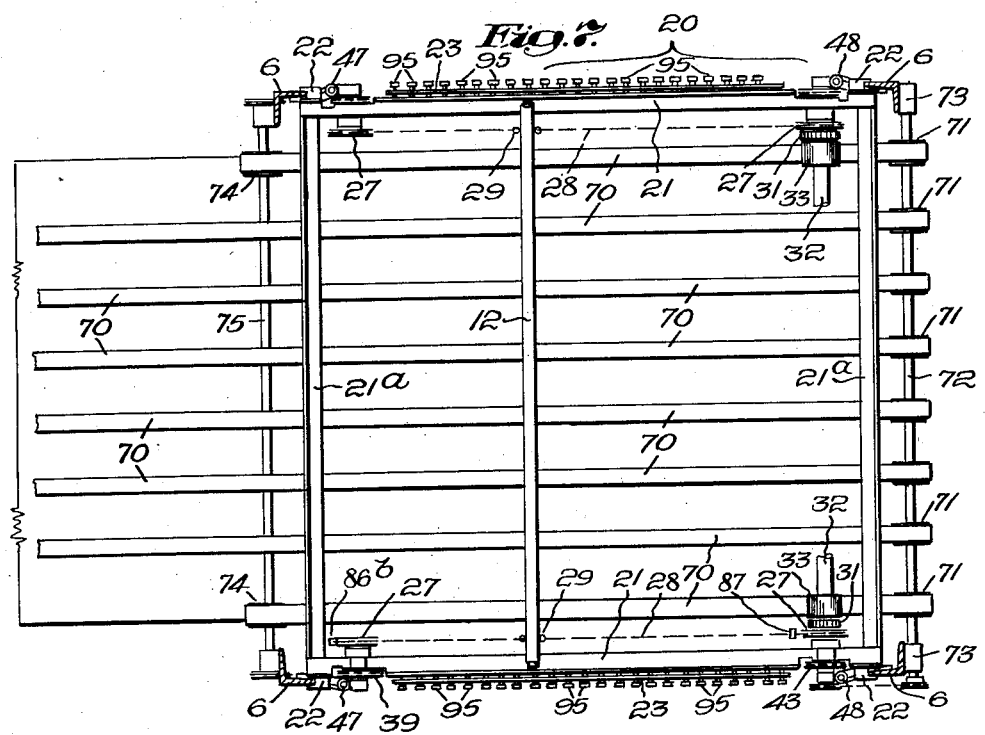
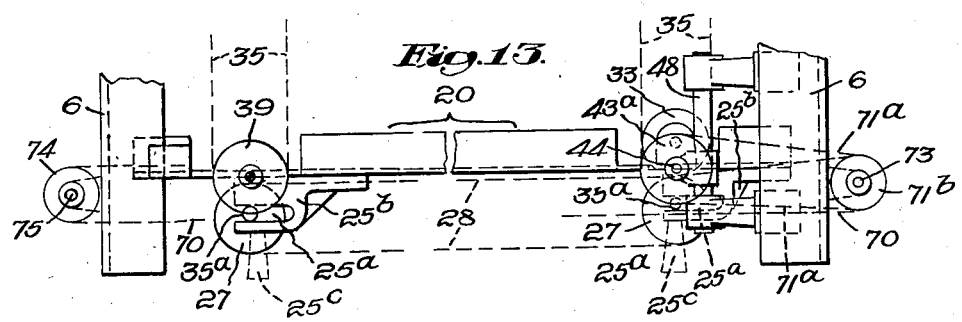
Inventors:
Edgar F. Hathaway,
Walter Bixby,
by Emery, Booth, Varney and Townsend
Attys July 30, 1935. E. F. HATHAWAY ET AL 2,009,799
APPARATUS FOR DISPLAYING RUGS AND THE LIKE
Filed Feb. 2, 1932 7 Sheets-Sheet 5
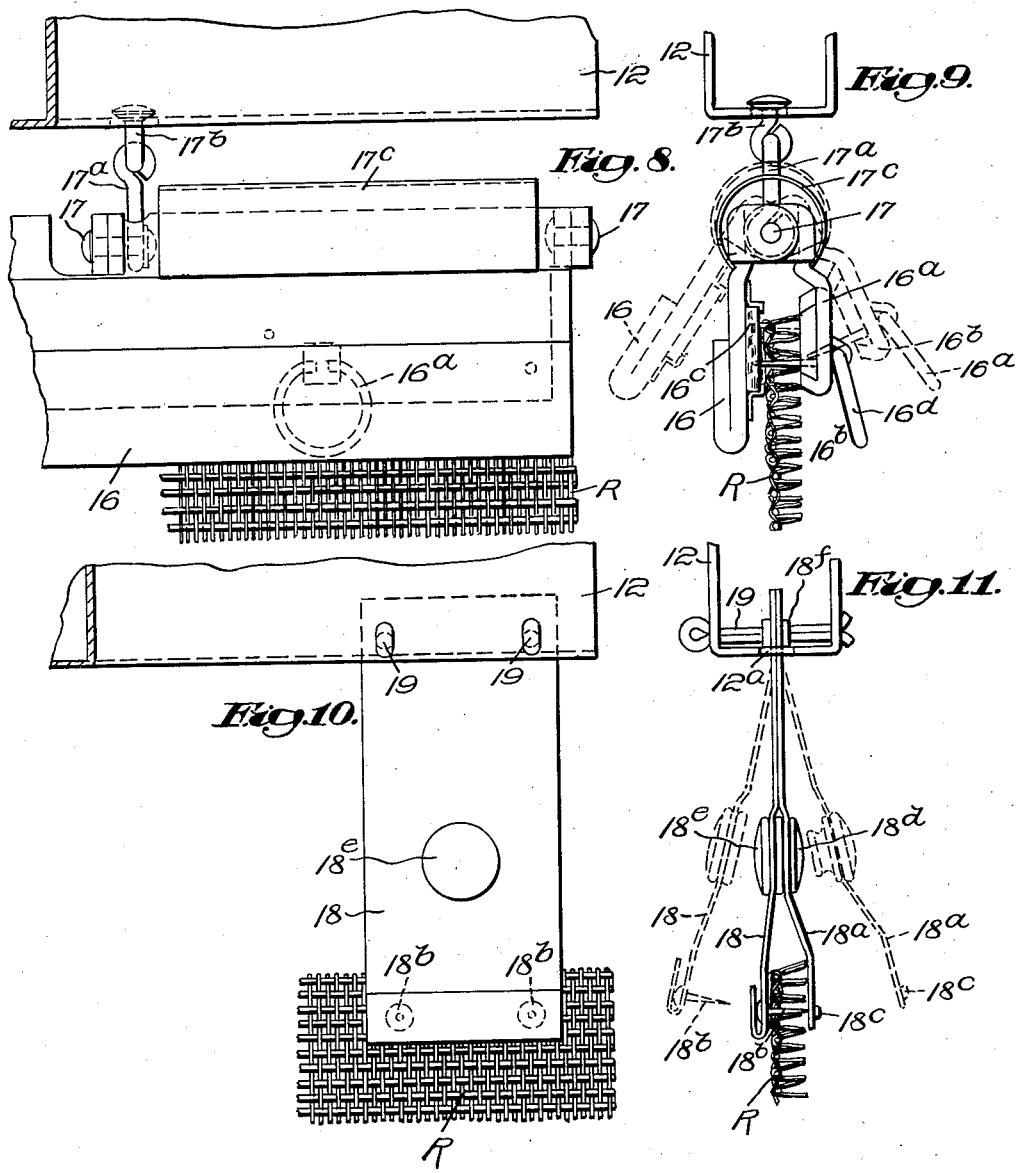

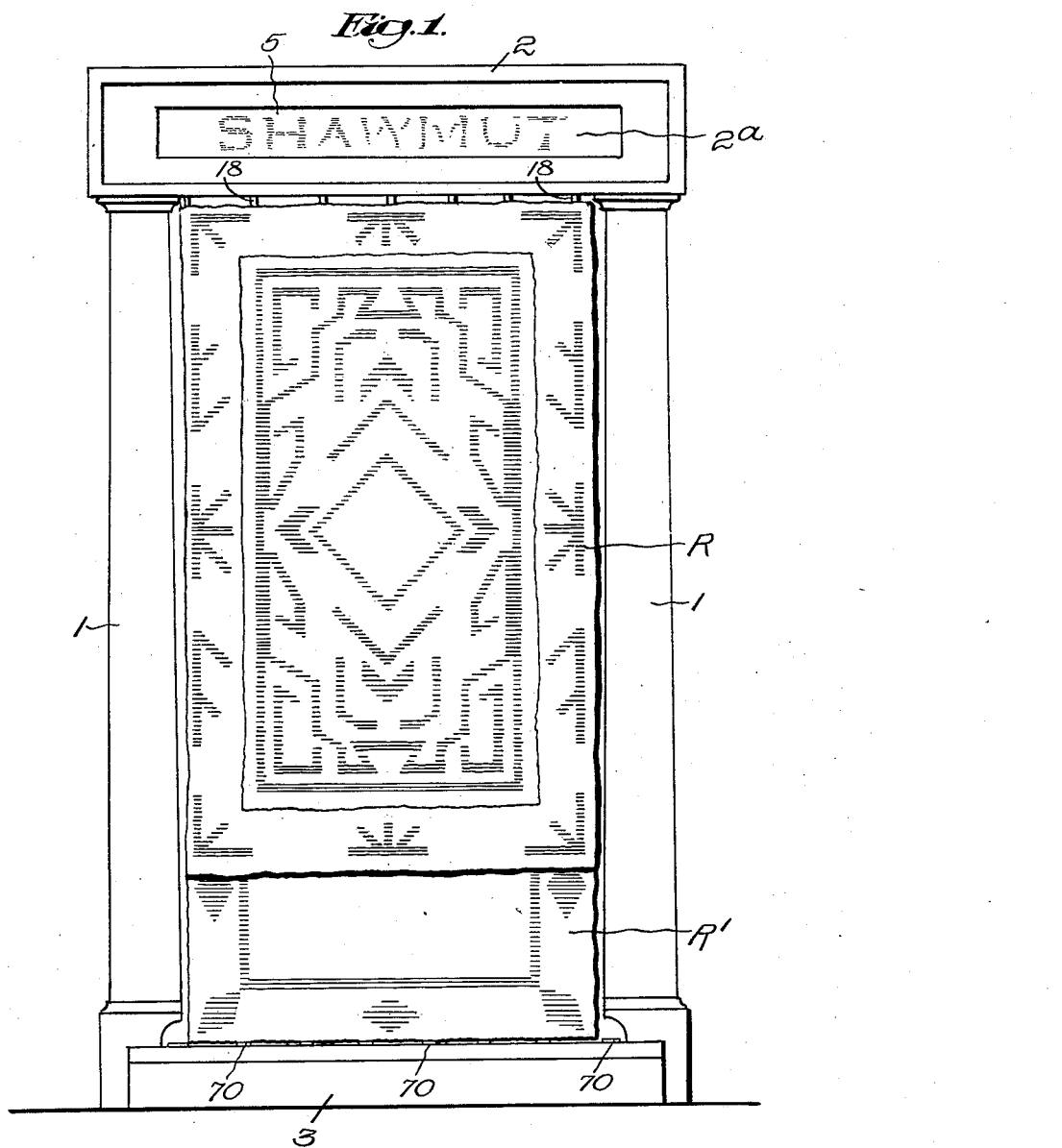

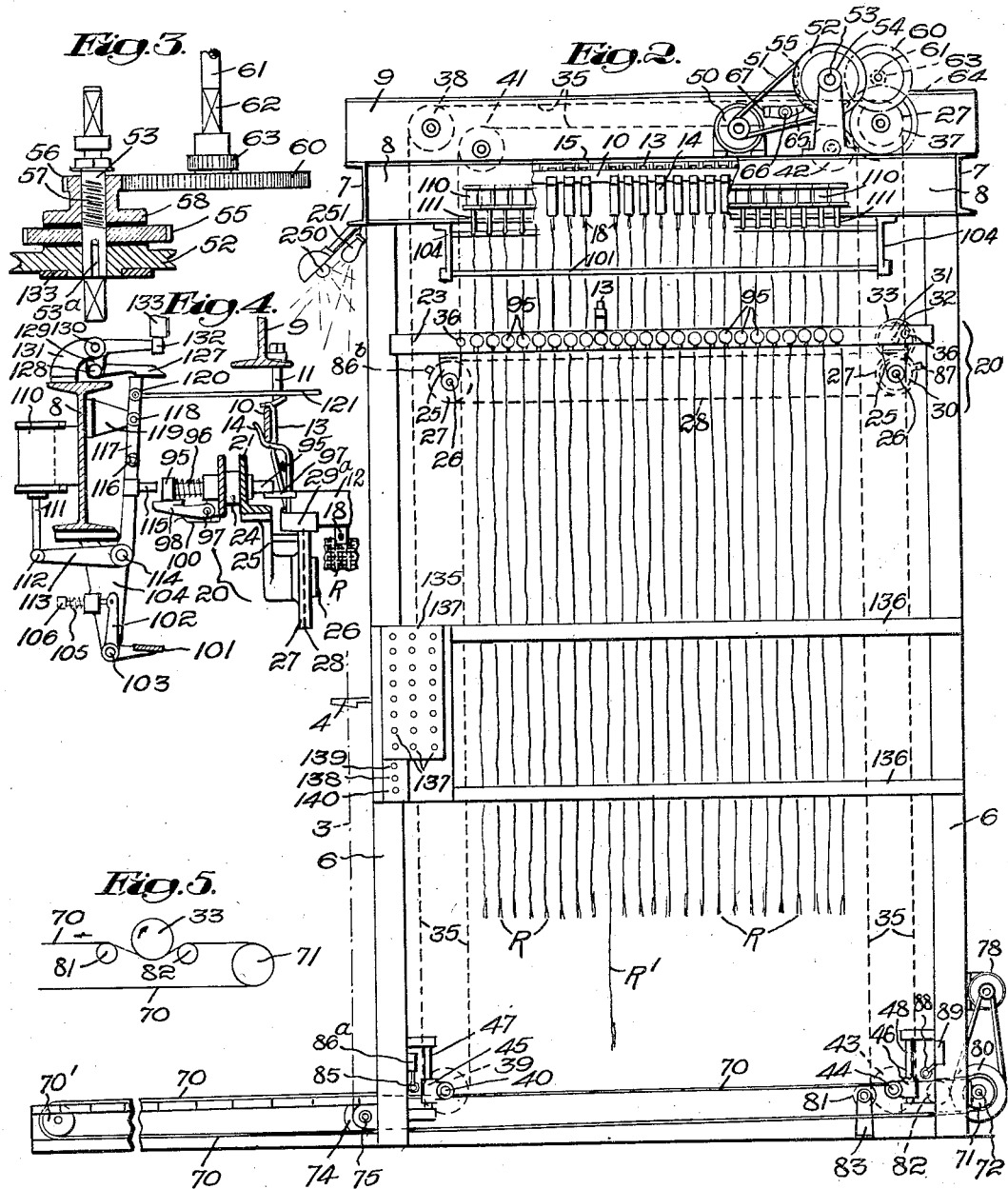

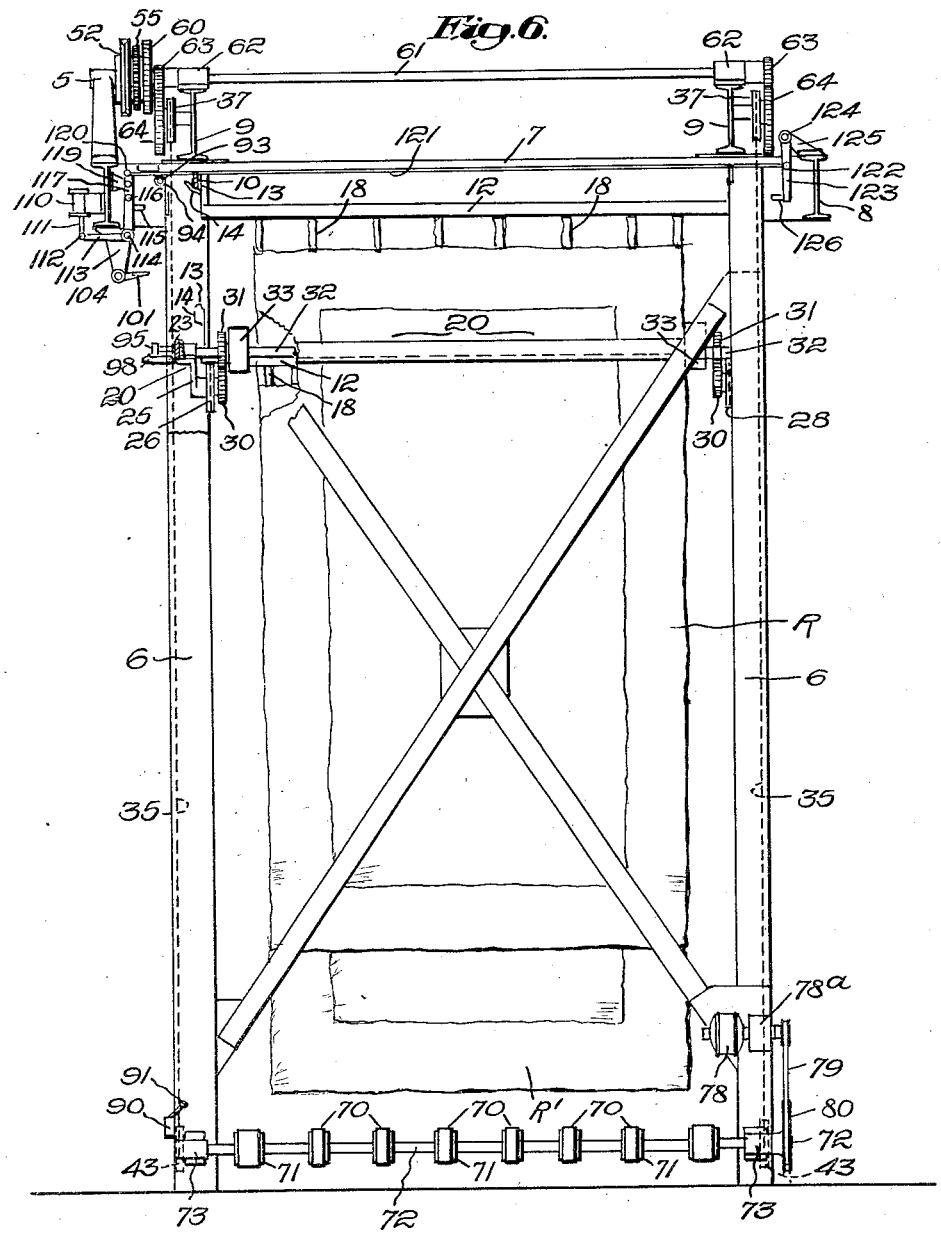

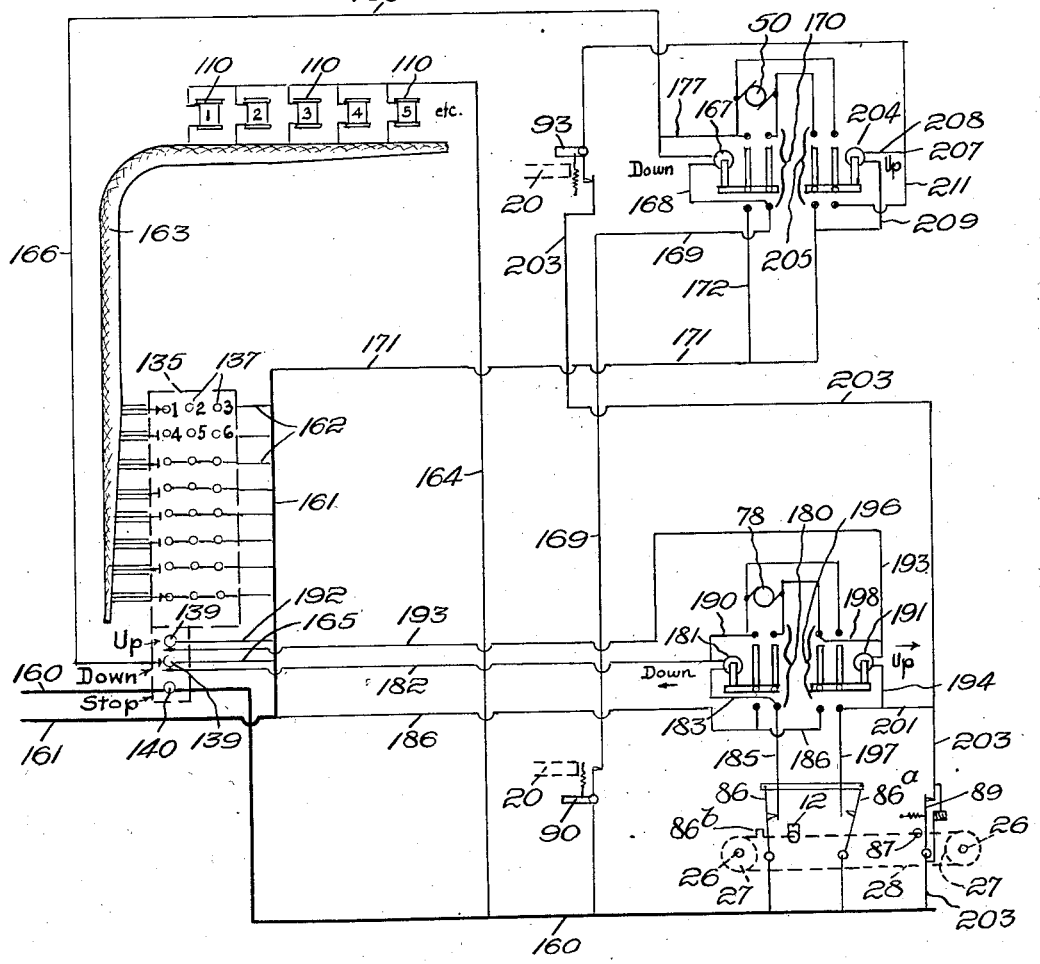

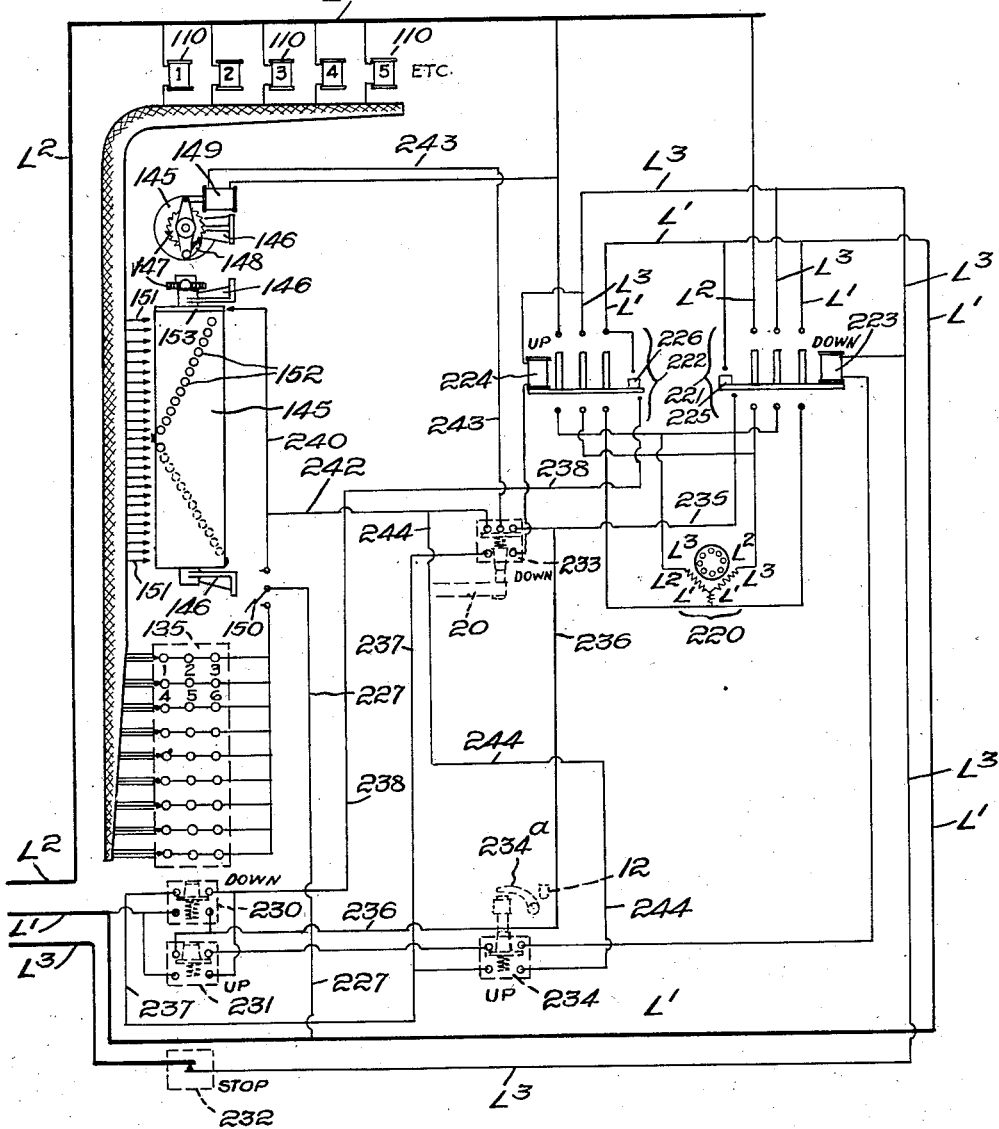

Patented July 30, 1935

2,009,799

UNITED STATES PATENT OFFICE 2,009,799

APPARATUS FOR DISPLAYING RUGS AND THE LIKE

Edgar F. Hathaway, Wellesley, and Walter Bixby, Dorchester, Mass.

Application February 2, 1932, Serial No. 590,458

23 Claims. (Cl. 40—52)

Our present invention aims to provide selective means for conveniently and quickly displaying rugs, carpets, linoleum or other floor coverings, wall covering, or other relatively large or bulky webs and sheets, whereby any one of a plurality of them may readily be exhibited, preferably in outstretched position, with elimination of the manual effort, confusion, loss of time and other difficulties heretofore attendant in this connection.

In the drawings illustrating by way of example certain embodiments of the invention, Fig. 1 is an elevation of the front or display face of one form of apparatus in accordance with the invention;

Fig. 2 is a right side elevation of the apparatus of Fig. 1, the cabinet and other concealing portions being removed and parts broken away;

Fig. 3 is a plan, with parts in horizontal section illustrating a portion of the rug-moving or elevator mechanism, upon a larger scale;

Fig. 4 is a partial vertical section transversely through the upper portion of the mechanism of Fig. 2, taken at right angles to said figure and as viewed from right to left in said Fig. 2, that is, looking toward the front of the apparatus; said Fig. 4, which illustrates portions of the control and release mechanism, is on a larger scale than Fig. 2;

Fig. 5 is a diagrammatic view of other rug-moving or conveyor mechanism at the lower portion of the apparatus;

Fig. 6 is a rear elevation of the apparatus as a whole, as viewed from the right in Fig. 2;

Fig. 7 is a horizontal section through the apparatus of Fig. 2 as if on a line immediately above the rug-moving or elevator mechanism in said Fig. 2, and viewed from above;

Figs. 8 and 9 are respectively front and side elevations of one means for attaching a rug or the like to a carrier;

Figs. 10 and 11 are views similar to Figs. 8 and 9 of a modified form of rug attaching means;

Fig. 12 is a wiring diagram of the apparatus of the preceding figures;

Fig. 13 is a side elevation corresponding to the lower portion of Fig. 2, showing a modified form of apparatus; and Fig. 14 illustrates automatic or display-sequence control means which may be employed in connection with the apparatus either of Figs. 1 to 12 or Fig. 13, the wiring diagram as shown in Fig. 14 being for the form of Fig. 13.

Referring first to Fig. 1, the apparatus as a whole may be variously dimensioned and arranged according to the space available, conditions of use, and other considerations. It may be contained in or largely concealed by a decorative cabinet or the like or behind a screen-like front set up against or sunk into a wall, in which case the main portion of the apparatus may be set back into a rear enclosure or room. For example, in Fig. 1 we have illustrated a display front including pillar-like uprights I, I supporting a transom 2 which together set off the suspended group of rugs R as in a decorative frame. At the base of this display frame or cabinet is a platform 3 of suitable area to receive flatwise an article of the largest size for which the particular apparatus is designed. In some instances a section of the floor of the room in which the installation is made may be utilized as the display surface. As shown, the display platform 3 is constructed and arranged so that it may be swung up into out-of-the-way position, as indicated by the dotted line in Fig. 2, where it may be held by one or more catches 4.

In the illustrative embodiment of Fig. 1, the face of the cabinet or enclosure is open, exposing the foremost rug R, but if desired this space may be covered by a dummy, screen or panel of attractive appearance and which may carry suitable advertising or other descriptive matter. The transom 2 or other portion of the apparatus is also admirably adapted for advertising purposes and may be provided with a window 5 adapted to receive advertising cards or to expose shifting or selectively illuminated indicia, signs or the like bearing appropriate information and data as to the various articles displayed, such as the manufacturer's name, or the style or pattern designation of the article, the price, sale number, etc., as indicated at 2a.

In the present embodiment of the apparatus, referring now to Figs. 2 and 3, the working parts are carried by suitable supports or framing herein including four main uprights or corner supports 6 which may be in the form of angle irons. These uprights 6 are cross-connected at their top as by the front and rear cross beams 7 and the similar longitudinal side beams 8, shown as of the I-type. Upon the front and rear cross beams 7 are other longitudinal I-beams or the like 9, set in somewhat from the side beams 8.

The apparatus preferably accommodates a relatively large number of the rugs or the like to be exhibited, some twenty-four exhibit articles R being indicated in Fig. 2. These are stored or held in the machine in such manner that each is selectively accessible for display, on call. In this instance they are normally suspended vertically and in compact position closely adjacent each other, as seen in the figures. The term "rug" as hereinafter used will refer to any of the generally large or bulky or other sheet articles which our apparatus is adapted for displaying.

Referring now particularly to Figs. 2 and 6, the rugs are individually releasably supported on bars or racks 10 extending from front to rear of the apparatus, one adjacent each side. As seen in Fig. 4, these racks or bars are attached to the top I-beams 9 as by means of the bolts 11. They are constructed to be capable of sustaining the weight of the entire series of rugs, but as will be later seen, this weight or a large portion of it is normally taken by the rug-moving or elevator mechanism to be described and comes upon the bars 10 only during the period of actual display of any particular rug.

Each rug is arranged for detachable association with the bars 10, as by means of suitable carrier or hanger means and latch mechanism at the opposite ends of frames, carriers or carrier-bars 12 to which the rugs are individually demountably connected. We will hereinafter refer to the individual hanger means for each rug as the rug carrier, including the main element, frame or bar 12 thereof, the means for attaching the rugs to it, and the latch mechanism for releasably connecting the carriers with the bar 10.

As seen in Fig. 4 and also in Figs. 8 to 11, the main longitudinal element of each such carrier may be in the form of a metal tube similar to that commonly employed in so-called "tube frames" or tuft-yarn carriers for Axminster looms, or it may be otherwise formed. Similarly, the latch devices at the ends of the carriers may be of the type used for such Axminster tube frames, including a movable spring-actuated hook 13 and a co-operating finger 14 projecting from the carrier bar 12. It will be understood that the several carriers 12 are thus adapted to be secured on the bars 10 and to be individually detached by release of their hook members 13. A series of spacers 15 may be provided along the bars 10 between the various rug carriers to position them and keep them properly distributed.

The rugs are removably attached to their carriers in any suitable manner, preferably in a fashion permitting them to flex freely with respect to the carrier. In Figs. 8 to 11 two forms of such holding or attaching means are illustrated. Referring first to Figs. 8 and 9, we have there shown a pair of plates, jaws or clamps 16, 16ª hinged together as by the hinge pins 17. These jaws may be of a length to extend substantially the full distance across the top of a rug to be supported, or a series of such jaws of lesser length may be provided. Links 17ª having eyes or bearings at their opposite ends disposed at right angles to each other movably connect the jaws, as by reception of the jaw pivots in the lower link bearings, with eyes 17ᵇ swiveled on the rug carrier 12. The described rug attaching devices are thus bodily universally movable with respect to the carriers, and are free to assume horizontal, vertical or intermediate positions.

The jaws or plates 16, 16ª are yieldingly urged toward each other as by the sleeve-like spring 17ᶜ. One of said members, herein the jaw 16, carries a series of pins or points 16ᵇ adapted to be passed through the rug and into a strip of wood or other suitable receiving material 16ᶜ on the inner face of the other jaw. The jaw 16ª carrying the pins 16ᵇ may be supplied with manual engaging means such as the ring 16ᵈ for convenience in opening the jaws against the pressure of the spring 17ᶜ, to release a rug held by them.

The rug supporting or attaching means as illustrated in Figs. 10 and 11 comprises a plurality of pairs of flexible strips or jaws 18, 18ª which may be of strong fabric, flexible sheet metal or other suitable material. At their lower portions one strip of each pair, herein the member 18, is provided with one or more pins or points 18ᵇ, disposed opposite receiving plugs or cups 18ᶜ in the other strip of each pair. The flexible strips or jaws 18, 18ª are adapted to be releasably interengaged in rug holding position as by means of suitable snap fasteners herein including the male and female elements 18ᵈ and 18ᵉ upon the respective strips. Each set of these flexible attaching devices is passed upwardly through a slot 12ª in the bottom of the frame or carrier proper 12 and is there secured as by means of pins 19 passed through the side walls of the carrier and through suitable eyelets 18ᶠ in the strip members.

In accordance with our invention, we provide means for moving any selected rug and its carrier to the horizontal or other display plane, which means may be variously embodied within the scope of our invention. In the present instance we have shown elevator mechanism upon which the given rug and its carrier may be taken, brought down and subsequently returned to place. The terms "elevator" or "elevator means," as hereinafter employed, will be understood to refer to any suitable vertical conveyor or other means for that purpose, and herein to connote the entire vertically traveling carriage or the like and parts moving with it, now to be described.

Such elevator means, indicated as a whole by the numeral 20, herein includes the elevator or carriage proper comprising a substantially rectangular frame including the side bars 21 cross-connected by one or more transverse pieces 21ª, best seen in Fig. 7. The elevator is suitably guided for vertical movement, this being conveniently effected by the corner uprights or angle irons 6 themselves, aided if desired, by hooked guides 22 adapted to engage over the adjacent flange of said angle irons, substantially in the manner seen in said Fig. 7.

The elevator side bars 21, as seen in section in Fig. 4, include an outer strip 23 attached to the adjacent side or angle bar 21 as by means of a series of bosses 24. Depending from each of these side bars 21, at the two sides of the elevator, are front and rear brackets 25. Each bracket 25 rotatably supports as at 26, Figs. 2 and 4, a sprocket 27 over which extend the endless carrier-shifting chains 28, one at each side of the elevator. The links of these chains are provided with cradles 29 shaped and arranged to lie beneath and receive the opposite end portions of any of the rug carriers. These cradles desirably have end fingers or the like 29ª to position a carrier both lengthwise and transversely and enable it to be advanced toward the front of the apparatus, and subsequently retracted, as the carrier-shifting chains 28 are moved in one or the opposite direction.

At one end of the elevator, the rear in this instance, the sprockets 27 of the chains 28 have pinions 30 fixed on their hubs. These pinions mesh with other pinions 31 on a cross shaft 32 suitably journaled on the elevator side bars 21, see Figs. 6 and 7. Near the opposite ends of this shaft 32, outside a rug received on the elevator, are pulleys 33 whereby the shaft, pinions 31, 30, sprockets 27 and hence the chains 28 may be driven, at the desired times, in a manner to be described.

For vertically moving the elevator we have herein provided endless chains 35, one at each side, as seen in Fig. 6, and one only of which appears in Fig. 2. Each such chain 35 is anchored on the elevator at two horizontally aligned points 36—36. Starting from the rear point of anchorage, at the right in Fig. 2, each chain extends up over a sprocket 37, thence forwardly and down over a front top sprocket 38, then under and up around a bottom front sprocket 39 rotatably supported on the framing as at 40. Each chain then leads up to its front point of anchorage 36 on the elevator and thence up over a second front top sprocket 41, across to the rear and down over a second rear top sprocket 42, down about the rear bottom sprocket 43 rotatably mounted on the framing as at 44, and thence up and back to the rear point of anchorage 36 on the elevator. Take-up means is desirably provided for these chains, and we have indicated the same in connection with the bottom sprockets 39 and 43, these being supported on bearings 45 and 46 respectively, which may be vertically adjusted upon posts 47, 48 on the frame uprights 6, thereby to tighten or loosen the chains as required.

While in some instances the elevator mechanism may be manually operated, we desirably employ power-operated means for the purpose. As seen in Figs. 2, 3 and 6, the power is provided by an electric motor 50 of the reversible type which is drivingly connected as by a belt 51 with a pulley 52 angularly fixed on a short shaft 53, the latter being axially movable with respect to the pulley, as by means of the pin and slot connection indicated at 53ª. Said shaft 53 is supported in suitable bearings, one of which is seen at 54 in Figs. 2 and 6. Normally loose on said shaft 53 and adjacent the pulley 52 is a ratchet wheel 55, immediately beyond which is a pinion 56 having spiral threaded relation with the shaft, as indicated at 57. The pinion 56 has fixed to it a clutch disc 58, and suitable clutch facing material is provided between said clutch disc and the ratchet wheel 55 and also between the latter and the adjacent face of the pulley 52. The pinion, clutch disc and ratchet are thus longitudinally shiftable upon the shaft, so as to be clutched to or freed from the pulley 52, outward movement of the pinion being limited as by a stop nut on said shaft.

The pinion 56 is in mesh with a large gear 60 fast on a cross shaft 61, Figs. 3 and 6, extending across between the top beams 9 and suitably journaled thereon at its opposite ends as in the bearings 62, 62. This cross shaft 61 carries pinions 63, 63, one at each side of the machine frame, respectively meshing with the gears 64, 64 supported for rotation with the rear top sprockets 37 for driving the chains 35. Operation of the motor 50 in one or the opposite direction will thus move the chains to raise or lower the elevator, through the described gearing connections. A pawl 65, Fig. 2, pivoted on a fixed part of the framing as at 66 and counter-weighted as at 67 cooperates with the ratchet wheel to catch and hold the elevator against dropping should the power or the motor fail for any reason. Should the elevator attempt to drop, its weight causes the gear 60, Fig. 3, to turn reversely, in a direction to cause the pinion 56 and clutch disc 58 to be shifted along the shaft 53 into position to clutch the ratchet wheel to the pulley. As the ratchet wheel is held against turning, by the pawl 61, all of the gearing elements will be prevented from moving, thus supporting the elevator at whatever point it then chances to be.

As previously noted, it is one object of our invention to bring the selected rug out for display flatwise, desirably in horizontal position, or substantially so, as if upon a floor, so that the rug may be judged and examined in use position; or it may be at an inclination. Accordingly we have herein provided rug-extending or conveyor mechanism for receiving any rug brought down from the suspended group and taking it out into flat display position. Such means may be variously embodied, and as one example we have herein shown mechanism of the endless conveyor type. Referring to Figs. 2, 5 and 6, one or more horizontally disposed belts or conveyors 70 are arranged at the lower portion of the display framing, a series of eight such belts transversely of the apparatus being indicated in Fig. 6. These belts are received about pulleys 71 appropriately spaced crosswise of the apparatus and fixed upon a bottom cross shaft 72 journaled in bearings 73, 73 on the rear corner uprights 6; see also Fig. 7.

The outer belts of the series are shown as extending only to a point adjacent the front uprights 6, where they pass about pulleys 74 on a second or intermediate cross shaft 75, see particularly Fig. 7. The other belts or conveyors extend forwardly substantially to the front of the platform 3 where they are received around front pulleys 70', Fig. 2, on a front cross shaft journaled on the platform. The upper runs of the described conveyor belts lie along the platform floor (or the room floor in the case of a built-in installation). They are adapted to carry a rug out into fully extended position on the floor or platform, where it can be examined at will, walked on, turned back to view the under face, or otherwise manipulated, substantially as freely as if taken from the usual stock of rugs and laboriously spread out by hand.

This conveyor or rug-extending mechanism, as in the case of the elevator, may be manually operated, but is preferably power-driven, independently of the elevator or otherwise. As seen in Figs. 2 and 6, we have in the present embodiment provided for the purpose a second electric motor 78, also of the reversible type, suitably supported as upon one of the rear uprights 6. It is drivingly connected through reduction gearing 78ª to the conveyor belts as by means of a belt 79 passing about a pulley 80 fixed on the rear cross shaft 72.

In Figs. 2 and 6 the elevator is shown in partly descended position, with one rug carrier received on its chains 28, the corresponding rug R' having been brought down until its lower edge is about to engage the horizontal conveyors 70. Upon further descent the lower or leading portion of this rug will be received by the belts 70 and carried forward toward display position. The elevator is allowed to continue its descent until the pulleys 33 on the elevator, previously described, come down on the upper runs of the outer belts, which are in vertical line with them. At the opposite sides of the points at which these pulleys first come into contact with the belts, the latter are additionally supported as by means of the rolls 81, 82 rotatably mounted on brackets 83. These supporting rolls 81, 82, the rear pulleys 71 and the belts 70 are seen in the diagrammatic Fig. 5 in which one of the elevator pulleys 33 is shown in position just after being received on said belts.

The motor for the rug-extending conveyor mechanism is started substantially simultaneously with the starting of the elevator motor, or soon enough after it to put the conveyor in motion before the lower edge of a descending rug can come into contact with it, this being effected by the control mechanism to be described. Hence the conveyor belts 70 are moving when the elevator pulleys 33 come down into contact with them. By reference to Fig. 5 it will be understood that the upper runs of these belts, which are then moving forwardly, toward display position, as indicated by the arrow, will cause the pulleys 33 to turn in a clockwise direction, also as indicated by the arrow. This rotation of the pulleys 33 is transmitted through the gears 31, 30 to the rear sprockets 27 of the carrier-shifting chains 28, causing the upper runs of the latter to be moved toward the front, that is, toward the left in Fig. 2. At substantially the same time that said pulleys 33 are set in motion by contact with the belts 70, the carrier 12 of the particular rug to be displayed has reached its lowermost position and is then itself carried forward by the forwardly moving shifter chains 28 on which it is then supported by the chain cradles 29. The carrier is traveled forwardly until its entire rug has been brought out into display position, when the carrier comes up against the arm 85 of a double-throw switch 86, 86a, Figs. 2 and 12, opening the "out" or "down" circuit of conveyor motor 78, and setting the "back" or "up" circuit of said motor in readiness for subsequent closure, as will be more fully explained in connection with Fig. 12.

The rug accordingly remains at rest in its display position, for inspection. When it is to be returned, referring still to Fig. 2, the horizontal conveyor motor 78 is again started, by operating the "up" control or button 139, to be referred to, driving now in a reverse direction, to carry the rug back along the horizontal conveyors 70 and also causing the carrier-shifter chains 28 to move reversely. The rug carrier accordingly is taken back to its original location on the elevator.

Thereupon the elevator starts its return or up movement, desirably automatically initiated, as by means of a stop 87 on one of the shifter chains 28 which brings up against the switch arm 88 of a magnetic locking spring-opening switch 89 for closing the elevator motor reverse or "up" circuit. During the previous descent of the elevator, said stop 87 came down into a position immediately in front of said switch arm 88. When the shifter chains 28, the supported carrier 12 and its rug R' moved forward, the stop likewise moved forward the same distance. Hence, in the return operation said stop 87 comes back into operative engagement with said switch 89 when it has traveled back the same distance that it moved forward. A similar stop 86b, Fig. 2, also on one of the shifter chains 28, upon return of said chains engages the switch arm 85 to operate the switch 86, 86a reversely, as will be explained more fully in connection with Fig. 12.

The rising elevator carries the particular rug accurately back to the same position upon the supporting bars 10 from which it was taken. The construction of the carrier latches 13, as seen in Fig. 4, is such that the latter will be cammed open by the under face of the bars 10 themselves, whereupon they snap back into position as in said Fig. 4, overlying the bar and thus again detachably connecting the carrier to the latter. The elevator is normally left at such level that it supports the weight of the entire series of rugs, holding the carrier latches just above the bars 10. Thus the latches and bars 10 are relieved of the weight, and the latches may readily be operated to release any selected carrier.

The descent of the elevator in bringing a selected rug to display position is automatically stopped at or substantially at the time when the rug carrier is received upon the conveyors 70. For this purpose an elevator down-stop switch is provided, for example, as seen at 90 in the lower left portion in Fig. 6, including a switch arm 91 disposed in the path of a descending part of the elevator or of the rug carrier itself. Similarly, the elevator is automatically brought to rest at the limit of its return movement, after having again deposited the carrier on the supporting bars 10, an up-stop switch 93, Fig. 6, being herein provided upon a fixed part of the framing as upon one of the cross beams 7. The switch arm 94 of this switch is positioned in the return path of any suitable part of the elevator mechanism or of the returning rug carrier itself.

As previously pointed out, the invention contemplates such disposition of a plurality of rugs that any particular rug may be selected and displayed. Accordingly, in the present embodiment suitable means is provided for releasing a selected rug carrier. Such means may be variously operated and controlled but preferably in a manner whereby the exhibitor may effect the selection from a central or remote control station. In the present instance we have illustrated electrically controlled, positive means for the named purpose, including a control board or the like.

Referring now to Fig. 4, we have mounted along the side frames 21 of the elevator a series of plungers 95, normally held out as by the coil springs 96. A pair of such plungers is disposed in line with each supported rug carrier, one at each end, and immediately opposite the hook latches 13. The inner ends of these plungers may be formed with a step or shoulder 97 adapted to abut and force the hook latch inwardly, to unlock it, the extreme end of the plunger extending beyond this shoulder and adapted to engage the carrier bracket 13 laterally or otherwise to assist in guiding it during up and down travel.

Referring still to Fig. 4, there is associated with each plunger a spring-pressed catch 98 pivoted on the adjacent elevator side frame bar 23 as at 99, suitable spring means for urging it upwardly being indicated at 100, to catch and hold the plunger in in-pressed position. Thus it is positively assured that the carrier latches will be held open during initial down-movement of the elevator and during an ample period to allow for clearing of the latches from the supporting bars 10. These plunger catches 98 are subsequently released, herein by a trip bar 101 supported by the bell crank levers 102 pivoted at 103 upon brackets 104 depending from the beams 8; see also Fig. 2. Similar trip bars are supplied at each side of the apparatus. They are normally yieldingly held up, as in Fig. 4, by expansion springs 105 acting between a portion of the adjacent bracket 104 and the head of a slidable stud 106 connected to the upper arm of the corresponding bell crank 102. As the elevator travels down, the catches 98, which are then holding in the pair of plungers at the opposite ends of the selected carrier, depress and slide past the trip bars, without being disturbed. During the return ascent, however, the catches come up beneath and are released by the trip bars.

It will be noted that the described series of plungers and catches are carried by and travel with the elevator. Hence no rug carrier can be released from the supporting bars 10 unless the elevator is up in position to receive it.

The illustrated means for initially operating the latch-released plungers, under the selective or other remote control, comprises a series of solenoids 110 at one side of the apparatus, herein the right side, seen in Fig. 2. They are conveniently supported on one of the side beams 8. A number of the solenoids at each end of the series is seen in Fig. 2, wherein the supporting beam 8 has been broken away centrally to afford a view of the underlying bar supports 10 and a portion of the supported series of rug carriers. To the core 111 of each solenoid is pivotally attached, as at 112, one arm of the corresponding bell crank 113 of a series thereof pivoted, as at 114, on an adjacent fixed part, such as the brackets 104 previously mentioned. The other arms of these bell cranks each carry a stud 115 in line with the head of the corresponding latch-releasing plunger 95. When any given solenoid is energized its armature 111 is drawn up, rocking the upper end of its bell crank 113 inwardly, so that the corresponding stud 115 is thrust in against the adjacent plunger 95 which is immediately caught and retained by its latch 98.

A similar series of solenoids may be utilized at the opposite side of the apparatus, but we preferably employ positive mechanical connection between the plunger-operating studs at the opposite sides, insuring simultaneous release of both latches of the selected carrier. In the present embodiment, therefore, referring again to Fig. 4, the inner arms of the bell cranks 113 at one side of the machine, that seen in Fig. 2, are extended upwardly and pivoted as at 116 to rockers 117 supported at 118 on brackets 119 on the adjacent beam 8. One end of a cross link 121 is pivoted as at 120 to the upper end portion of each rocker. Referring now to Fig. 6, these cross links 121 extend across to the opposite side of the exhibit apparatus and each is there pivoted as at 122 to a swinging finger 123 hung as at 124 on a bracket 125. The lower end of each finger 123 carries a stud 126 corresponding to the stud 115 at the solenoid side. It will be understood that there is a solenoid and pair of studs 115, 126 cross-connected by a link 121 for each rug carrier to be controlled.

In order that the solenoids may be sensitive in operation and to insure positive release of the carrier latches, we desirably employ power operated means for taking up and completing latch-releasing movement of the studs 115, 126, upon starting of or indication for such movement by the corresponding solenoid. With this in view, referring again to Fig. 4, the upper ends of the series of rockers 117 are extended and lie beneath a series of vibratory wiper latches 127 pivotally supported on a rod 128 extending along the series of solenoids. This rod is carried by the lower series of bell cranks 129 rockably mounted as at 130 on appropriate stands 131 on the side beam 8. The other arm of one bell crank 129 carries a cam roll 132 for cooperation with a cam 133 carried by or driven from any suitable moving part, being in this instance on the pulley 52, which operates at relatively high speed as compared with the elevator sprockets, by reason of which and of the initial down movement of the elevator which lets the whole series of carriers down onto the rack bars 10, the wiper levers 127 are in operation in ample time to release the selected carrier before the elevator can start down. Thus the bell crank 129 is rocked to vibrate the wiper latches over the tops of the respective rockers 117, in a direction from right to left in Fig. 4. In the normal or inactive position of the several rockers 117 their wiper latches do not operatively engage them. But when a selected solenoid is energized, inward movement of the corresponding stud 115 and of the upper end of the arm of the bell crank 113 whereon it is carried, moves the lower end of the corresponding rocker 117 inwardly to a slight extent and consequently moves out the upper end of the latter so that it will engage behind and be caught by the corresponding wiper lever 127. Thus a positive power-actuated outward movement of the upper end of the rocker 117 is effected, which, through the described connections including the cross link 121, will force the two plunger-operating studs 115, 126 at the opposite sides of the machine inwardly toward each other, thereby thrusting in the plungers. The latter are then held by their respective catches, thus positively opening the carrier latches at the two ends of the selected carrier.

The control station, switchboard or button panel for controlling the entire sequence of operations of the exhibiting apparatus may be located at any desired or convenient point, as near or as remote as may be required. For the purpose of illustration we have here shown a selective control board 135, Figs. 2 and 12, on the framing, carried between longitudinally extending tie bars 136. Any suitable selective circuit-closer, such as a series of selector devices, buttons, tumbler switches or the like is provided, these corresponding in number to the maximum number of rugs to be exhibited, in this instance twenty-four. These devices, illustrated as buttons 137, may be numbered or otherwise identified to correspond with the rugs of the series to be exhibited. Each button 137 is in circuit with the solenoid for the corresponding rug, and thus serves to control selectively the release of the carrier latches for its designated rug.

In addition, the control station or panel includes the master control buttons or elements 138, 139 and 140 which may be designated respectively as the "down" or exhibit, the "up" or return, and the stop buttons. When it is desired to display any particular rug, for example, rug #3, button #3 of the numbered series is pressed. The carrier of rug #3 is thereupon released for reception on the elevator. If the exhibit or down button 138 is then pressed the apparatus is set in motion to bring down and move out the rug into display position, where it is automatically brought to rest in the manner previously described. To return a displayed rug, the exhibitor or customer need only press the return or up button 139, whereupon a reverse sequence of operation takes place, the rug being moved rearwardly and then upwardly, to its original supported position on the cross bars 10. This return operation also is automatically terminated as already explained.

The third master control element or stop button 140 is desirable but not essential. It is associated with the operating circuits, as will be more fully explained in connection with the wiring diagram, so that the operation of the entire apparatus may be stopped at any point, either while a rug is being brought out for display or is being returned. This allows a partly returned rug to be brought back, or a partly displayed rug to be immediately rejected and returned, merely by subsequently pressing the exhibit or the return button, as the case may be. Such provision for the stop, repeat or recall of any particular rug makes the apparatus flexible in operation and immediately subject to the will of the customer or exhibitor.

We have referred to the selective control of the entire series of rugs, by which they may be selectively displayed, in any desired order. It will be understood, further, that within the scope of our invention the control may additionally or alternatively be such as to provide for exhibiting the entire series of rugs or any portion of it in a predetermined sequence, going through all or less than all rugs or in any pre-selected order, the exhibit apparatus remaining continuously in operation for any desired interval of time. Each rug may be left in display position for a determined period and then automatically returned, so that the entire operation may be automatic and continuous, repeating in cycles, without attention from an exhibitor. Such continuous operation may be effected, for example, by means of any suitable pattern control of the selectively operable mechanism previously described.

We have herein illustrated one form of such serial or pattern control means. Referring now to the partly diagrammatic Fig. 14, we have there shown for the purpose an automatic selective circuit-maker in the form of a pattern or control drum 145 rotatably mounted at any convenient point, herein on the machine frame. As illustrated (both in plan and in end elevation, for clearness) it is journaled in brackets 146 and carries a ratchet whereby it may be advanced step-by-step, as by means of the pawl 148 and operating solenoid 149. A double-throw switch 150 provides for throwing into action either this automatic control or the selective operator control such as already described. Adjacent the rotary drum 145 is a series of contacts 151 corresponding to those of the button panel 135, and while the drum carries a series of buttons or pins 152, one for each contact. These pins may be distributed circumferentially in any desired arrangement upon the drum, being shown for the purposes of illustration in regular spiral line, so as to engage and close the various contacts 151, corresponding to the various rugs, in regular succession, from #1 to the highest number or the reverse. Said pins or contacts 152 are connected to a common ring contact 153, and may be shiftable on the drum, or the drum or the pin-carrying portion of it may be demountable for replacement by similar elements having the pins arranged or patterned in accordance with any display sequence desired for the rugs.

In Fig. 12 we have shown a wiring diagram for the apparatus as described in connection with Figs. 1 to 11. The two sides of the main line are represented by the heavy lines 160 and 161. The selective control board is seen at the left central portion of the figure, marked 135. Each of the selector buttons 137 is connected with one side of the line, 161, by the leads 162, and also with the corresponding solenoid 110, through the cable 163. The solenoids 110 are in connection with the opposite side of the line, 160, through the wire 164. Operation of any selector button 137 accordingly will actuate its solenoid 110 to release the corresponding rug carrier for reception on the elevator. The selectively displayed indicia appearing at the transom or elsewhere may be arranged in circuit with the corresponding solenoid 110.

The down control or button 138 is connected with one side 161 of the line, by the lead 165, and is connected by the wire 166 at the left and top of the diagram with a relay or magnetic switch actuator 167 in turn connected by the conductors 168 and 169 with the opposite side 160 of the line, through the elevator down stop switch 90 previously mentioned. Through the described connections, operation of the down button 138 energizes the relay 167, which in turn closes the double-bladed down switch 170 of the reversible elevator motor 50.

Wherever the term "down" is hereafter used it will be understood to refer to the rug-displaying operation, both of the elevator and of the rug-extending conveyor. Similarly, the term "up" will refer to the rug-returning operation of either and both of said mechanisms.

The down circuit for this elevator motor 50, starting from the main trunk 161 at a point on the diagram just to the right of the upper right corner of the control panel 135, is through the conductor 171 and sub-lead 172 to the lower left contact of said motor down switch 170, through the latter to the upper left contact of said switch, through the motor and back to the upper right switch contact, across to the lower right contact of the switch, onto the conductor line 169 previously mentioned, and thence, through the then closed switch 90, to the other main line 160. A shunt 177 is provided between the left side of the motor switch 170 and the upper side of the relay, establishing a holding circuit through the relay and holding the motor switch closed, so that the down button 138 may be released, once the motor has been started, without interrupting the latter.

Through the described connections the elevator, carrying the selected rug, is moved down by its motor 50. It continues to descend until it engages the "down" stop switch 90, which it opens, breaking both the relay holding and the motor "down" circuits, bringing the elevator to rest in its "down" position as previously described. It will be understood that the switch 90 is spring-closed upon subsequent up movement of the elevator, and that its re-closing does not again start the elevator motor in the down direction, as there is then no circuit through the relay 167 to close the motor down switch 170, until the down control 138 is next operated.

In addition to starting the elevator down, operation of the down control or button 138 also causes the rug-extending conveyor, the belts 70, to start traveling in a direction to carry the rug outwardly to display position, that is, to the left in Fig. 12. The reversible motor for driving said conveyor is indicated at 78 in the diagram. The "down" switch for this motor is indicated at 180, that is, for throwing in said motor to run in a rug-extending or "out" direction. A relay or magnetic switch actuator 181 is provided for operating this motor switch, similarly as in connection with the elevator motor 50. The circuit for this relay 181 is from the side 161 of the main line through the lead 165 to the down button 138 and a conductor 182 to the relay 181, thence through a wire 183 to the lower right contact of the motor switch, and thence through the line 185 and the blade 86 of the double-throw switch 86, 86ᵃ onto the opposite side 160 of the main line. The relay 181 is thus energized to close the conveyor motor down switch 180.

The conveyor motor circuit at this time is from the side 161 of the main line at the left of the diagram through a lead 186 to the lower left contact of the motor switch 180, up across the latter to the upper left contact, through the motor to the upper right switch contact, across the switch to its lower right contact, and through the line 185 and the blade 86 of switch 86—86ª previously mentioned onto the side 160 of the main line. A shunt 190 connecting the upper side of the relay 181 with the left side of the motor switch 180 affords a relay holding circuit, similarly as for the relay 167 previously described.

Through the described connections the rug-extending conveyor mechanism is thrown into operation substantially simultaneously with the starting down of the elevator, so that it is already moving out or to the left when the lower or leading edge of the descending rug is received by the conveyors 70. During descent of the elevator the said conveyors continue to carry out the rug onto the floor or platform 3 and, as previously described, when the pulleys 33 of the carrier-shifting chains 28 on the elevator come down onto the outer belts 70, said chains start to move in the direction to shift the particular rug carrier 12 outwardly, to the left in Fig. 12. A selected carrier assumed to be supported on the shifter chains 28 of the elevator is indicated at 12 in the lower right corner of Fig. 12. When the carrier has reached its extreme "out" or left position, wherein the full length of the rug has been extended on the platform in display position, the carrier 12 comes up against and opens the left side 86 of the double switch 86—86ª, opening the holding circuit of the relay 181 and throwing out the conveyor motor 78. Subsequent closing of said left side 86 of the switch 86—86ª accordingly will not again start the motor 78 in the "out" direction until the "down" button 138 is next pressed. Said opening of the left side 86 of the switch 86—86ª closes its other side, at the blade 86ª, the two blades being connected as indicated in the diagram. This conditions the conveyor motor and relay for subsequent reverse operation.

Upon the shifter chains 28 of the elevator is a stop 86ᵇ normally lying outwardly or to the left of the switch blade 86. When the shifter chains 28 were moved to advance the rug carrier 12 this stop 86ᵇ was carried outwardly, to the left, away from the switch 86 for a distance corresponding to the total movement of the shifter chains. The function of said stop 86ᵇ will be referred to below.

It is now assumed that the selected rug is extended in a display position upon the platform 3, where it was brought to rest by the automatic opening of the switch blade 86 in the manner described. The rug may then be freely handled, walked on, turned back or otherwise examined, at the will of the customer or demonstrator. When it is desired to return the rug the "up" or "return" control 139 is pressed, by which the conveyor is started back, to the right in Fig. 12, and the elevator is thereafter automatically started up when the rug carrier 12 has arrived at its original position relative to the elevator. These operations are effected in the following manner.

The up button 139 serves to close the circuit of a relay or magnetic switch closer 191. This relay circuit is from the side 161 of the main line, through a wire 192 to said up button 139 and through the lead 193 to said relay 191, thence through a connector 194 to the lower right contact of the "up" switch 196 for the conveyor motor 78. From there it passes through a connection 197 onto the other side 160 of the main line, passing first through the then closed blade 86ª of the double throw switch 86—86ª.

This energizing of the relay 191 serves to throw the motor "up" switch 196 to closed position, throwing in the motor 78 for reverse or up operation of the conveyors 70. The circuit for the motor, beginning at the side 161 of the main line, at the left of the diagram, is then through the lead 186 already mentioned to the lower left contact of the motor switch 196, across the latter to the upper left contact, through the motor and back to the upper right switch contact, across the switch to its lower right contact, and through the lead 197 and closed switch 86ª back onto the other side 160 of the main line. A shunt 198 between the left side of the motor switch 196 and the line 193 establishes a holding circuit for the relay 191.

Assume now that the conveyors are moving reversely, that is in the direction to carry the rug back or to the right in Fig. 12, and to effect a similar direction of drive for the carrier shifting chains 28 of the elevator. The elevator does not rise until the rug carrier 12 has returned to the same position thereon as when it descended. It will be seen that this reverse movement of the carrier shifting chains 28 brings the previously-mentioned stop 86ᵇ on the latter back to its original position where it engages and closes the blade 86 of the double throw switch 86—86ª, preparatory for the next "out" or "down" movement of the conveyors, and at the same time opens the switch blade 86ª.

Simultaneously with or just prior to the opening of said switch 86—86ª, the magnetic-locking spring-opening switch 89 referred to in connection with the previous figures is automatically closed. Said switch 89, illustrated at the lower right corner of the diagram, is in the relay and motor circuits for the "up" operation of the elevator. This closing of said switch 89 is effected by the other stop 87 on the carrier shifting chains 28, also previously described. Closing of this switch 89, in addition to starting the elevator up, also serves to maintain a holding circuit through the relay 191, which otherwise would be broken by the opening of the switch 86ª. Accordingly the conveyor motor 78 is continued in operation after the elevator has started up. Said relay holding circuit is through a cross lead 201 connected into both the relay and motor circuits and to a connection 203 which contains the magnetic locking switch 89, passing across the latter down into the side 160 of the main line.

Thus the closing of the switch 89 is automatically effected just as the rug carrier 12 comes back into proper position to be carried up to its original stored location on the rack bars 10. The relay and motor circuits for the return or up operation of the elevator motor 50 are as follows, there being in this connection an elevator up relay 204 and motor up switch 205 controlled thereby, seen at the upper right portion of the diagram of Fig. 12. Starting from the side 160 of the main line, at the bottom of the diagram, the relay circuit is through the lead 203 and the then closed switch 89 up to and through the "up" stop switch 93 to the junction 207 whence a conductor 208 extends to the relay 204. From the relay the circuit continues through a lead 209 onto the lead 171 already mentioned, extending from the other side 161 of the main line, at the left in the diagram.

Through said relay circuit the elevator motor switch 205 is closed and the motor 50 is driven reversely, that is, in the direction to raise the elevator. The elevator motor circuit is then in part the same as just described for the relay 204, starting from the side 160 of the line at the bottom of the diagram and passing through the closed switch 89, the lead 203 and the up stop switch 93 to the junction 207 whence it continues through a connection 211 onto the lower right contact of the motor switch 205, across the latter to its upper right contact, across the motor and back to the upper left switch contact, again through the switch and onto the lower left switch contact, onto the line 171 and thence to the other side 161 of the main line. A shunt or holding circuit for the relay 204 is unnecessary because the switch 89, being of the magnetic locking type, is automatically held closed until the up stop switch 93 is opened by the return of the elevator 20 to its full original or "up" position. Such opening of said elevator up stop switch 93 breaks both the motor and relay up circuits just described and also releases the switch 89 for automatic opening by its spring. All parts and circuits are thus restored to their original condition, leaving the apparatus in readiness for the selection and display of any other desired rug.

The master stop device or button 140 previously referred to is located in the side 160 of the main line. It is a "break" device, by which the main line and hence any of the described circuits may be broken, at any desired time. Thus by operating this stop device the elevator and the rug-extending conveyor may be halted at any stage either of their down or their return movements. Subsequent operation of the up or the down controls 139 or 138 will cause the operation of the apparatus to resume where interrupted. If desired, this stop control may be at the end of a flexible conductor or other remote control which may be placed in the hands of the viewer or customer, who may be seated at any convenient point to view the rugs as they are brought out for display. If, during automatic operation, the viewer wishes to make a more extensive examination of any particular rug, the stop button in his hand enables him to stop the apparatus and hold such rug until he again presses said button 140 to reestablish the operating circuit.

In Fig. 13 and also in connection with the partly diagrammatic Fig. 14 we have illustrated a modified form of drive, wherein but one motor for the elevator and the rug-extending means is employed, and have also illustrated means for full automatic continuous sequential operation of the apparatus. In Fig. 13 is a view corresponding to the lower portion of Fig. 2, like reference numerals being used for like parts, while parts not otherwise mentioned may be considered to be the same as in Figs. 1 to 11.

In said Fig. 13 the lower portions of the front and rear runs of the elevator chains or belts are seen at 35. On the shaft 44 carrying the sprocket 43 (not shown) for the rear run of the elevator chain 35 at the right side of the apparatus is an additional pulley 43$^a$ which is drivingly connected as by a belt 71$^a$ with a pulley 71$^b$ on the shaft 73 which carries the conveyor pulleys 71 (not seen) of the previous figures. Said shaft 73 is thus driven by the elevator chains, and in turn drives the conveyors or belts 70, which may be the same as in the previous figures.

Referring still to Fig. 13, the elevator is indicated as a whole, partly diagrammatically, by the numeral 20, the carrier-shifting chains on the elevator being seen at 28 and their sprockets at 27. In this instance the elevator is releasably associated with its lifting chains 35, as by means of pins 35$^a$ projecting from the chains and received in open bearings 25$^a$ in brackets 25$^b$ depending from the elevator frame. In the down position of the elevator, it is received on some fixed supporting means, such as the blocks 25$^c$ in vertical line with said brackets 25$^b$. The elevator chains 35, after depositing the elevator on said blocks, continue to run, during the remaining out-operation of the conveyor belts and of the carrier-shifting chains 28. The pins 35$^a$ of the elevator chains merely move out from the open bearings 25$^a$, leaving the elevator at rest. In the return or up operation, the elevator chains move reversely to the same extent that they moved forwardly after leaving the elevator, the pins 35$^a$ re-enter the open bearings 25$^a$, pick up the elevator and carry it and the rug back to normal or stored position.

The operating and control circuits for a single motor system as just described, and also for an automatic control, which latter may equally well be applied in connection with Figs. 1 to 12, are illustrated in Fig. 14.

Referring to said Fig. 14, a three-phase motor is indicated at 220, connected for operation in one or the opposite direction from a three-wire main line, indicated by the heavy lines marked respectively L', L$^2$ and L$^3$. This three-line feed circuit is adapted to be connected into the motor 220 through the main motor switches 221 and 222, the former to connect the motor for operation to carry the elevator down and the conveyor out to the front of the machine, and the other main switch 222 to connect the motor for operation in the reverse or up direction. Associated with the motor switches 221 and 222 respectively are the relays or magnetic switch actuators 223 and 224, and also the holding circuit switches 225 and 226, the latter being mechanically associated with the main motor switches, closing when they close, and each making holding circuit whereby its respective relay 223 and 224 is kept energized.

A manual control panel 135 is provided similarly as in the preceding figures, the individual buttons or switches of which control the corresponding circuits of the carrier-selecting solenoids 110. The switch 150, previously mentioned, provides for alternatively connecting the system for manual selective operation, or for full automatic sequential operation. When said switch 150 is thrown onto the lower contact of the diagram Fig. 14, the manual selector panel 135 is conditioned for operation, the individual buttons and the corresponding solenoids being in circuit across from the main line L' through the lead 227, switch 150, through any selected button of the panel 135 and the corresponding solenoid 110, and out onto the main line L$^2$ at the top of the diagram.

Similarly as in the preceding figures, we provide a down circuit-closer, button or switch 230, a similar up device 231 and a master-stop circuit-breaking button or like device 232. The circuit-closers 230, 231 are each illustrated as controlling two circuits, alternately, through upper and lower pairs of contacts respectively. Normally the upper pairs of contacts are closed or cross-connected, as by the spring-pressed contact strips as indicated. When the button or lever of either circuit-closer 230, 231 is depressed or operated the circuit across the upper pair of contacts is broken, and is closed across the lower pair.

The control system of Fig. 14 also includes two other circuit-closers 233 and 234 of a similar type as the circuit-closers 230, 231. They are located for operation in a similar manner as the switches 93 and 86—86a of Figs. 1 to 12, that is, by the maximum up movement of the elevator, and by the maximum forward movement of a rug carrier 12, respectively. The upper closer 233 of this pair is adapted to initiate the down movement of the elevator and forward movement of the conveyor, and to halt the return movement of the elevator, while the other closer 234 serves to stop the down and forward movement of the elevator-conveyor mechanism and, during automatic operation, to initiate their return up movement.

In Fig. 14 the elevator 20 is assumed to be at rest in its normal or up position, wherein the upper level of contacts of the closer 233 is held closed against spring pressure. The lower closer 234, for halting the down movement and automatically initiating the return movement normally stands with its upper level of contacts closed, as illustrated. These upper contacts of the closer 234 are arranged to be disconnected, and the lower pair to be connected, by the movement of the selected rug carrier 12 down and out to its extreme forward position, where it engages and depresses a lever 234a, actuating the closer 234.

Assume now that the switch 150 is closed onto the lower contact shown, for manual selective control of the apparatus. After operating the desired selector device or button of the panel 135 to select any particular rug for display, the down closer 230 is actuated by the operator. This closes the circuit of the down relay 223, by connecting it across between the main lines L' and L³. This circuit is from the main line L' at the lower left corner of the diagram across the then closed lower contacts of closer 230 down onto and across the closed upper contacts of the closer 231, across the closed upper contacts of the closer 234 and thence through the relay 223 onto the line L³. Said down relay 223 is thus energized and throws the motor down switch 221, thereby connecting the three lines L', L³, L² into the motor, in the order named. This energizing of the relay 223 also simultaneously closes the holding circuit switch 225, previously open, whereby the relay continues to hold the motor switch 221 closed, without necessitating continued holding of the manual down closer 230. This holding circuit is from the line L' at a point just above the holding circuit switch 225, through the latter and down through wires 235 and 236 to the left contact of the then closed upper contacts of the closer 231, then continuing the same as the relay circuit just described, through the relay 223 and onto the line L³.

When the elevator has fully descended and has been dropped by its chains, and the rug-extending conveyor and the carrier-shifting chains of the elevator have moved fully forward, as described in connection with Fig. 13, the rug carrier 12 engages the lever 234a and operates the closer 234. The relay holding circuit is thereupon broken, between the upper contacts of said closer 234. The conveyor mechanism accordingly comes to rest, leaving the rug in extended display position. Incidentally, the lower pair of contacts of the closer 234 are then closed, this having no effect during manual selective control of the apparatus but only under its full automatic operation.

To return a displayed rug, under manual selective control, the up closer 231 is operated, to interconnect its lower pair of contacts and to open its upper pair. This makes a circuit through the up relay 234. This "up" relay circuit is from the main line L' at the lower left corner of the diagram across the then closed lower contacts of the closer 231, up onto and across the then closed contacts of the closer 230, thence through a connection 237 onto and across the then closed lower contacts of the closer 233, to said relay 224 and out onto the line L³ at the upper right portion of the diagram.

This energizing of the up relay 224 throws the motor up switch 222, connecting the main lines into the motor in the order L', L², L³, that is, with the lines L² and L³ interchanged with respect to their previous manner of connection through the down switch 221. Accordingly the three-phase motor 220 operates reversely, moving back the conveyor mechanism and raising the elevator.

Simultaneously with the closing of the up motor switch 222 the associated holding circuit switch 226 is also closed, to continue a closed circuit through the relay 224 and thus keep the motor in operation after the up closer 231 has been manually released. This holding circuit is from the line L' just above said holding circuit switch 226, down across the latter and through a connection 238, onto and across the then closed upper contacts of the closer 230, and thence the same as in the just described up relay circuit; that is, through the connection 237 and across the then closed lower contacts of the closer 233, to the relay 224 and out onto the line L³.

The motor continues to run in this rug-returning direction until the elevator reaches its normal "up" position, in which it engages and operates the closer 233, breaking the circuit across the lower pair of contacts of the latter and reclosing the circuit across its upper level of contacts. Thus the elevator again comes to rest, having restored the rug and its carrier to original stored position, similarly as in Figs. 1 to 12.

Under full automatic control, the apparatus or system is designed to run continuously, one rug after another being automatically selected, displayed and returned, the whole operation continuing in predetermined sequence, and repeating so long as desired. The motor circuits and the relay holding circuits are the same as just described in connection with manual selective operation, but through the automatic mechanism, already referred to, the circuits of the relays 223 and 224 are automatically made, in turn, rather than by manual operation of the circuit-closers 230 and 231, the control drum pattern or automatic selector device 145 being automatically moved after the display of each rug. This automatic operation enables a customer or other person to view the whole series of rugs rapidly, pick out the one or more which particularly appeal, and then recall them selectively. Or if the apparatus is being used for advertising or display purposes, as in a store window or elsewhere, it may be left in continuous operation, displaying and repeating the entire series of rugs so long as power is supplied.

For such automatic operation, the switch 150 is thrown onto the upper contact of the diagram, Fig. 14, which action, assuming the elevator is up, starts the whole automatic cycle. The solenoids 110 for releasing the individual rug carriers are then automatically actuated in predetermined sequence, their circuits being from the main line L' at the bottom of the diagram through the connection 227, the switch 150, a lead 240, onto the ring contact 153 of the selective circuit-closing drum or pattern element 145, and thence through the particular solenoid 110 and onto the line $L^2$ at the top of the figure, similarly as in connection with the manually selective operation. The circuit for the mechanism which moves or steps around said selective element 145 is also between the main lines L' and $L^2$, being indicated as taking off from said lead 240, through a connection 242, onto and through the two left contacts of the upper level of the closer 233, which are interconnected, closed in the up position of the elevator, up through a connection 243 to the stepper solenoid 149 and thence out onto the line $L^2$ at the top of the diagram.

At the start of the automatic operation, with the elevator in up position, throwing of the switch 150 onto its upper contact immediately closes a circuit through the down relay 223. This circuit, starting from the line $L^3$ at a point just to the right of the relay 223, is through said relay, down and across the then closed upper contacts of the closers 234 and 231, back to the right and up through the connection 236, onto and across the then closed upper level of contacts of the closer 233, through the connection 242, the switch 150 and down through the lead 227 onto the main line L'. Accordingly said down relay 223 closes the down circuit for the motor and the down relay holding circuit, at the switch 225, as described in connection with the manual selective operation. The rug is carried down and out into display position, whereupon the lever 234a is actuated by the rug carrier, opening the upper contacts of the closer 234 and thus momentarily halting the rug in display position, but at once establishing a circuit across the lower pair of contacts of said closer 234.

Said closing of the lower contacts of the closer 234 automatically makes a circuit through the up relay 224. Starting from the line L' at the lower left portion of the diagram this up relay circuit passes up through the lead 227, the switch 150, across the connection 242 and down through a further connection 244 onto and across the then closed lower contacts of the closer 234, onto and up through the connection 237, across the then closed lower contacts of the closer 223, to the relay 224 and out onto the line $L^3$. The motor accordingly is reversed and driven in a direction to return the rug-extending conveyor and raise the elevator, the holding switch 226 being now closed, through the same holding circuit as described in connection with the manual selective operation.

On reaching its up position the elevator automatically interrupts the up relay holding circuit by breaking it between the lower contacts of the closer 223, and thereupon closes the circuits across the plurality of upper contacts of said closer. The circuit through the contact-selector operating solenoid 149 is thus established, said selector 145 is moved one step, another solenoid 110 is operated to select the next rug for display, and the elevator at once again starts down with the selected rug, the down relay circuit having been automatically closed across the upper contacts of the closer 233. The operation is thus continuous, going through the entire series of rugs, or so much of it as desired, and repeating, so long as the switch 150 remains in its up closed position. Obviously the contacts 152 of the selector device 145 may be adjustably arranged to come into play in any desired order or pattern. In case any one or more rug-storing spaces of the apparatus should be empty, or their rugs not wished to be displayed, the corresponding contact or contacts may be removed, covered or by-passed.

A master stop device 232 previously referred to is provided in the line $L^3$. It may be actuated at any time at the will of the customer, salesman or operator, to interrupt the entire operation of the apparatus at any point, similarly as in connection with the stop 140 of the figures previously described.

Special provision may be incorporated for lighting the apparatus and displayed rugs, such for example as indicated in Fig. 2, where we have shown two light sources 250 and 251, which may be single lights or a plurality or bank thereof, that numbered 250 adapted to throw light both downwardly and forwardly onto a displayed rug, and the other affording illumination downwardly and inwardly onto the stored or descending rugs. Desirably also some of the lights may be of the so-called "daylight" type, to facilitate examination of the displayed article under natural daylight conditions, while others may be of the ordinary type, to demonstrate the appearance of the displayed rug under normal or "artificial" lighting conditions, selective control switches for such lights being provided. Desirably also the manually operative switches or controls already described may be associated with warning lights or other signals, to indicate that the apparatus is on manual selective, or on automatic control, or is clear for transfer from one to the other, or other operative condition.

From the foregoing it will be understood that our present invention provides a unit of storage or storage assembly for a plurality of rugs or other articles such as previously enumerated and in which the individual rugs are always in condition available for call for display. The storing or supporting means for the rugs may be variously embodied, the latched carrier bars, supporting racks and latch releasing mechanism as herein shown being but one form of such means, other forms of which are disclosed and claimed in our co-pending applications, Serial Nos. 614,468 and 696,360, filed May 31, 1932, and November 2, 1933, respectively, including individual or other beam-like support for the several rugs selectively controllable and suitably driven. In accordance with the invention the rugs are displayed in flat condition, desirably substantially horizontal, in which position they may be freely examined, turned over to expose the under face, walked on or otherwise manipulated to the full extent customary in examining rugs. Where the rugs in their stored condition are supported at an elevation above that of their display position, as herein illustrated, the invention includes means for moving or extending them from their respective points of storage and causing them, so to speak, to turn the corner into flatwise extended position for display. It will be further seen that in accordance with the invention any rug of the stored plurality is selectively available at all times, provision being made for manual selective control by the demonstrator or customer, or for continuous automatic control in a predetermined sequence desirably with capacity for alternatively shifting from one control to the other, together with master control provision for halting the operation at any desired point, under whichever method of control the apparatus is then operating.

In addition to those already mentioned, numerous other advantages presented by our invention as above disclosed will be obvious. It is susceptible of use in various connections but is of especial service to rug, carpet and like manufacturers and selling agencies, such as department stores, rug houses, auctioneers, and others for whom it eliminates a vast amount of hitherto awkward and cumbersome display effort, and speeds up and reduces the cost of sale and advertising.

Our invention is not limited to the particular illustrative embodiments herein shown and described, its scope being set forth in the appended claims.

We claim:

1. In an apparatus for displaying rugs and the like, in combination with mechanism for selecting and moving individual rugs to and from display position and electric operating means therefor, automatic pattern-controlled means sequentially to display and return a series of rugs.

2. In an apparatus for displaying rugs and the like, in combination with mechanism for selecting and moving individual rugs to and from display position and electric operating means therefor, pattern means for controlling the selecting mechanism, and operating mechanism for said pattern means.

3. In an apparatus for displaying rugs and the like, in combination with mechanism for selecting and moving individual rugs to and from display position and electric operating means therefor, variable pattern means automatically to control the selecting mechanism, and means to operate said pattern means.

4. Rug and the like display apparatus comprising, in combination, rug storage means including a plurality of releasable holding devices each adapted to support a rug, elevator mechanism adapted to receive a selected rug-holding device and its attached rug, and conveyor means to receive the rug as presented by the elevator and to move it into extended position for display.

5. In an apparatus for displaying rugs and the like, in combination with a storage frame, a plurality of movable carriers individually adapted for attachment to a rug, rug attaching devices on each carrier, supporting means on the frame for the reception of the plurality of carriers, and releasable connections between each carrier and said supporting means.

6. In an apparatus for displaying rugs and the like, in combination, a frame enclosing a rug storage compartment, transversely extending means in said compartment for individually supporting a plurality of rugs in stored position, conveying means operative to receive any rug of the plurality and bodily move the same between upper and lower positions, other conveying means to receive and extend a rug in its lower position, and electrically controlled selecting and operating mechanism for each of said conveying means.

7. In an apparatus for displaying rugs and the like, in combination with a storage frame, movable carriers for a plurality of rugs, each adapted to support an extended or non-rolled rug, means on the frame for releasably supporting the plurality of carriers, and mechanism for bodily lowering and raising a selected carrier and its rug.

8. In an apparatus for displaying rugs and the like, in combination with a storage frame, movable carriers for a plurality of rugs, each adapted to support an extended or non-rolled rug, means on the frame for releasably supporting the plurality of carriers, mechanism for bodily lowering and raising a selected carrier and its rug, and means to move said carrier and rug bodily in a horizontal direction.

9. In an apparatus for displaying rugs and the like, in combination with a storage frame, movable carriers for a plurality of rugs, each adapted to support an extended or non-rolled rug, means on the frame for releasably supporting the plurality of carriers, and means to shift the position of a released carrier and its rug laterally with respect to the remaining supported plurality of carriers and rugs.

10. Rug and the like display apparatus, comprising, in combination, framing, supports for individual rugs thereon, a plurality of carriers each having means for holding a rug and for releasably positioning the carrier on the supports, means to select a carrier and its rug for display, an elevator to receive and move the selected rug and carrier vertically, conveyor mechanism to receive the rug and to guide and extend it into substantially flat display position, and mechanism associated with the elevator to advance the carrier relative thereto, to provide for full display of any rug irrespective of the position of its carrier when received on the elevator.

11. Rug and the like display apparatus, comprising, in combination, framing, supports for individual rugs thereon, a plurality of carriers each having means for holding a rug and for releasably positioning the carrier on the supports, means to select a carrier and its rug for display, an elevator to receive and move the selected rug and carrier vertically, conveyor mechanism to receive the rug and to guide and extend it into substantially flat display position, mechanism associated with the elevator to advance the carrier relative thereto, to provide for full display of any rug irrespective of the position of its carrier when received on the elevator, and manual control means for said selecting means, and said elevator and conveyor mechanism.

12. Rug and the like display apparatus, comprising, in combination, framing, supports for individual rugs thereon, a plurality of carriers each having means for holding a rug and for releasably positioning the carrier on the supports, means to select a carrier and its rug for display, an elevator to receive and move the selected rug and carrier vertically, conveyor mechanism to receive the rug and to guide and extend it into substantially flat display position, mechanism associated with the elevator to advance the carrier relative thereto, to provide for full display of any rug irrespective of the position of its carrier when received on the elevator, and automatic control means for said selecting means, and said elevator and conveyor mechanism.

13. Rug and the like display apparatus, comprising, in combination, framing, supports for individual rugs thereon, a plurality of carriers each having means for holding a rug and for releasably positioning the carrier on the supports, means to select a carrier and its rug for display, an elevator to receive and move the selected rug and carrier vertically, conveyor mechanism to receive the rug and to guide and extend it into substantially flat display position, mechanism associated with the elevator to advance the carrier relative thereto, to provide for full display of any rug irrespective of the position of its carrier when received on the elevator, and optionally manual or full automatic control means for said selecting means, and said elevator and conveyor mechanism.

14. Apparatus for displaying rugs and the like, comprising in combination, a frame, a series of carriers having rug attaching devices and supporting latches, latch-receiving supports on the frame for the several carriers and rugs whereby the plurality of rugs is held in condition for selection, vertically movable mechanism adapted to receive any carrier of the series, means to release any selected carrier and its rug for reception by said mechanism, other conveyor means to receive the selected rug as it descends and to move it to extended display position, and means to drive said vertically movable mechanism and said other conveyor mechanism.

15. Apparatus for displaying rugs and the like, comprising in combination, a frame, a series of carriers having rug attaching devices and supporting latches, latch-receiving supports on the frame for the several carriers and rugs whereby the plurality of rugs is held in condition for selection, vertically movable mechanism adapted to receive any carrier of the series, means to release any selected carrier and its rug for reception by said mechanism, other conveyor means to receive the selected rug as it descends and to move it to extended display position, means to drive said vertically movable mechanism and said other conveyor mechanism, and selective control means for said carrier release means and for said drive means.

16. Apparatus for displaying rugs and the like, comprising in combination, a frame, a series of carriers having rug attaching devices and supporting latches, latch-receiving supports on the frame for the several carriers and rugs whereby the plurality of rugs is held in condition for selection, vertically movable mechanism adapted to receive any carrier of the series, means to release any selected carrier and its rug for reception by said mechanism, other conveyor means to receive the selected rug as it descends and to move it to extended display position, means to drive said vertically movable mechanism and said other conveyor mechanism, and optionally voluntarily or sequentially automatically selective means to control the carrier release means and said drive means.

17. In combination with a frame or carrier for suspending a rug or the like, rug attaching means comprising a pair of flexible jaw-like elements adapted to receive an edge portion of a rug between them, said elements depending from and attached to the frame or carrier, rug piercing means on one jaw element and cooperable receiving means on the other jaw element, and fastener means to retain said elements in their cooperative rug holding position.

18. In combination with a frame or carrier for suspending a rug or the like, rug attaching means comprising a pair of opposed flexible elements adapted to receive an edge portion of a rug between them, said elements depending from and attached to the frame or carrier, cooperable rug-engaging members on said elements, and fastener means releasably to retain said elements in their cooperative rug-engaging position.

19. In apparatus for the purpose described, in combination with a series of rugs or the like, carriers for the latter and fasteners to attach a rug to a carrier, supports for the carriers and attached rugs, and latch means for detachably connecting the carriers and said supports.

20. In an apparatus for displaying rugs and the like, in combination, a frame enclosing a rug storage compartment, a series of rug carrier bars disposed transversely of the frame, each adapted to suspend a rug, longitudinally extending supporting means at opposite sides of the frame for supporting said bars near their respective end portions, releasable connections between the bars and said supporting means, and means for selecting and conditioning any one of said carrier bars and its rug for movement to and from display position forwardly of the frame.

21. In apparatus for the purpose described, in combination, a plurality of carriers each adapted to support a rug in suspended position, a carrier support and latch means for detachably associating the carriers with it, and electrically operable means for initiating the release of any given carrier from its support.

22. In apparatus for the purpose described, in combination, a plurality of carriers each adapted to support a rug in suspended position, a carrier support and latch means for detachably associating the carriers with it, electrically operable means for initiating the release of any given carrier from its support, and other means for positively effecting the complete release of the given carrier.

23. In an apparatus for displaying rugs and the like, in combination, a frame enclosing a rug storage compartment and having an arched frontal portion in which a rug may be positioned as a curtain, a carrier bar to which the rug is removably attached, latch devices adjacent the ends of the carrier bar, and supporting means at the upper portion of the frame near the opposite ends of the rug carrier bar for releasably receiving said latch devices.

EDGAR F. HATHAWAY.
WALTER BIXBY.